United States Patent [19]
Miyoshi et al.

[11] Patent Number: 5,460,445
[45] Date of Patent: Oct. 24, 1995

[54] MIXER

[75] Inventors: Tsuyoshi Miyoshi; Akimasa Kuriyama; Takeshi Hatanaka, all of Takasago, Japan

[73] Assignee: Kabushiki Kaisha Kobe Seiko Sho, Kobe, Japan

[21] Appl. No.: 266,358

[22] Filed: Jul. 1, 1994

[30] Foreign Application Priority Data

Jul. 6, 1993 [JP] Japan .................................. 5-167079

[51] Int. Cl.⁶ .............................. B28C 7/04; B01F 15/04
[52] U.S. Cl. .............................. 366/76.7; 366/84; 366/97; 366/300
[58] Field of Search ...................... 366/76, 96, 97, 366/83, 84, 85, 300, 301, 297, 298; 425/208, 209

[56] References Cited

U.S. PATENT DOCUMENTS

| | | | |
|---|---|---|---|
| 4,744,668 | 5/1988 | Nortey | 366/84 |
| 4,818,113 | 4/1989 | Patel | 366/76 |
| 4,830,506 | 5/1989 | Borzenski | 366/76 |
| 5,061,078 | 10/1991 | Yada | 366/297 |
| 5,297,865 | 3/1994 | Engel | 366/84 |

Primary Examiner—Robert W. Jenkins
Attorney, Agent, or Firm—Oblon, Spivak, McClelland, Maier & Neustadt

[57] ABSTRACT

An apparatus in which a glass rod is inserted into a spinning oven to perform spinning and glass fiber yarn is drawn out at a shutter located in the lower end of the spinning oven, comprising a timer for measuring a time from the start of heating of the glass rod inserted into the spinning oven until the fall of glass drops formed by the heating of the glass rod and a detector below the shutter for detecting the fall of the glass drops, for the purpose of automatically opening the shutter when a preset time of the timer is over and automatically closing the shutter by detection by the detector, thereby dispensing with a worker's monitoring of the spinning oven for opening and closing the shutter and preventing a danger of giving damage to the shutter and the spinning oven in the event of delayed shutter opening-closing timing.

11 Claims, 15 Drawing Sheets

FIG. I
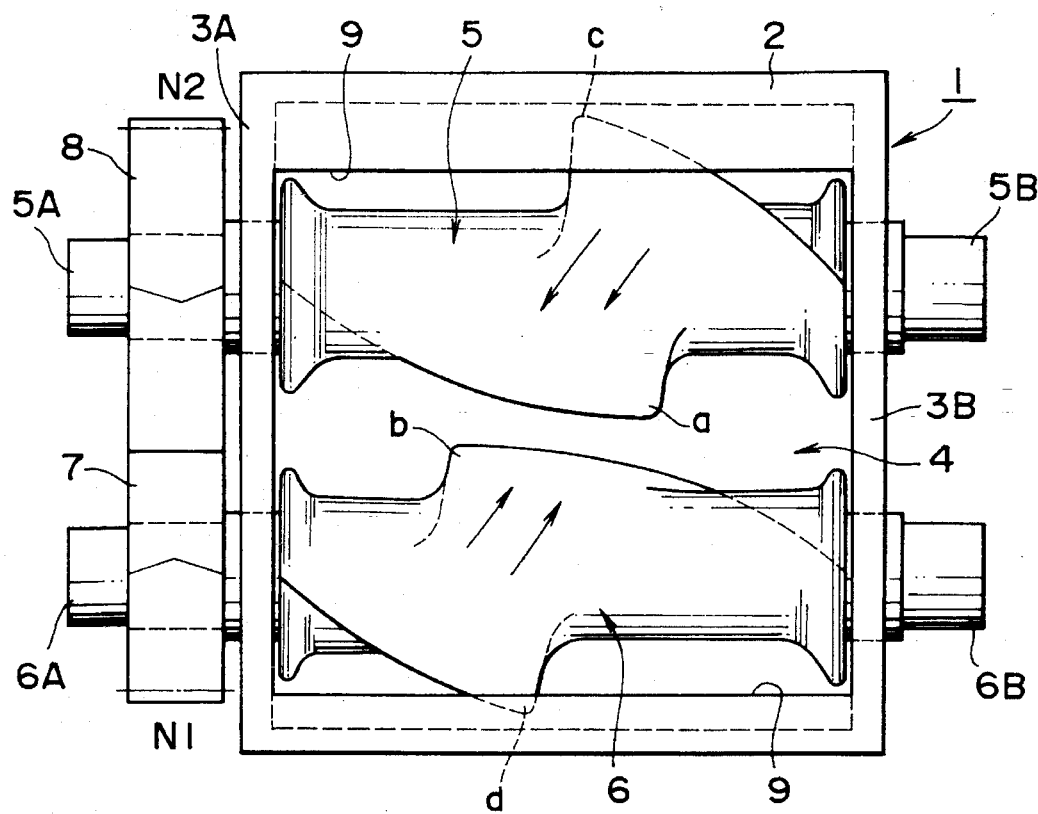
FIG. 2
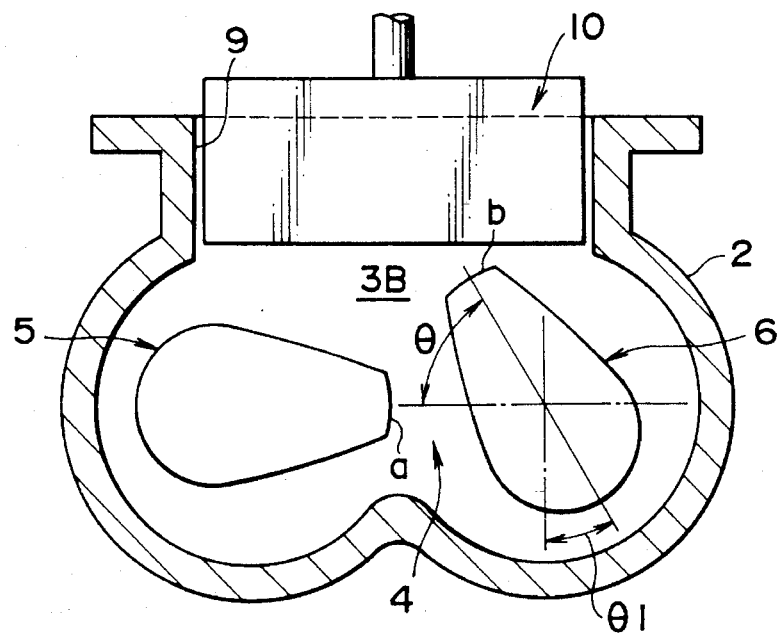

| ROTOR PHASES | →↘ | →↑ | →↗ | →↘ | →↓ | →↙ | →↖ |
|---|---|---|---|---|---|---|---|
| ROTOR SPEED N1 | 0 | 1 | 2 | 3 | 4 | 5 | 6 |

FIG. 11

| PHASE | ↑↓↑ | ↗↑ | ... | ↗↑ | ... | ↑↗ | ... | ↑↘ | ↑↗ | ↑↘ | ... | ↑↗ | ... | ↑↓ |
|---|---|---|---|---|---|---|---|---|---|---|---|---|---|---|
| SPEED OF ROTOR 5 | 0 | 1 | ... | 6 | ... | 12 | 18 | 19 | ... | 24 | 25 | ... | -6/31 | ... | 0/37 |
| ANGLE OF PHASE | 0 | +58.3 | | -9.7 | | -19.4 | -29.1 | +29.1 | | -38.8 | +19.4 | | +9.7 | | 0 |
| CURRENT VALUE (%) | 200< | 103 | | 200< | | 140 | 130 | 110 | | 125 | 105 | | 200/130 | | 200/120 |

| CLASSIFICATION | SPEED OF ROTOR 5 |
|---|---|
| CLASS I | -6→0→6, 31→37, |
| CLASS II | 12→18→24 |

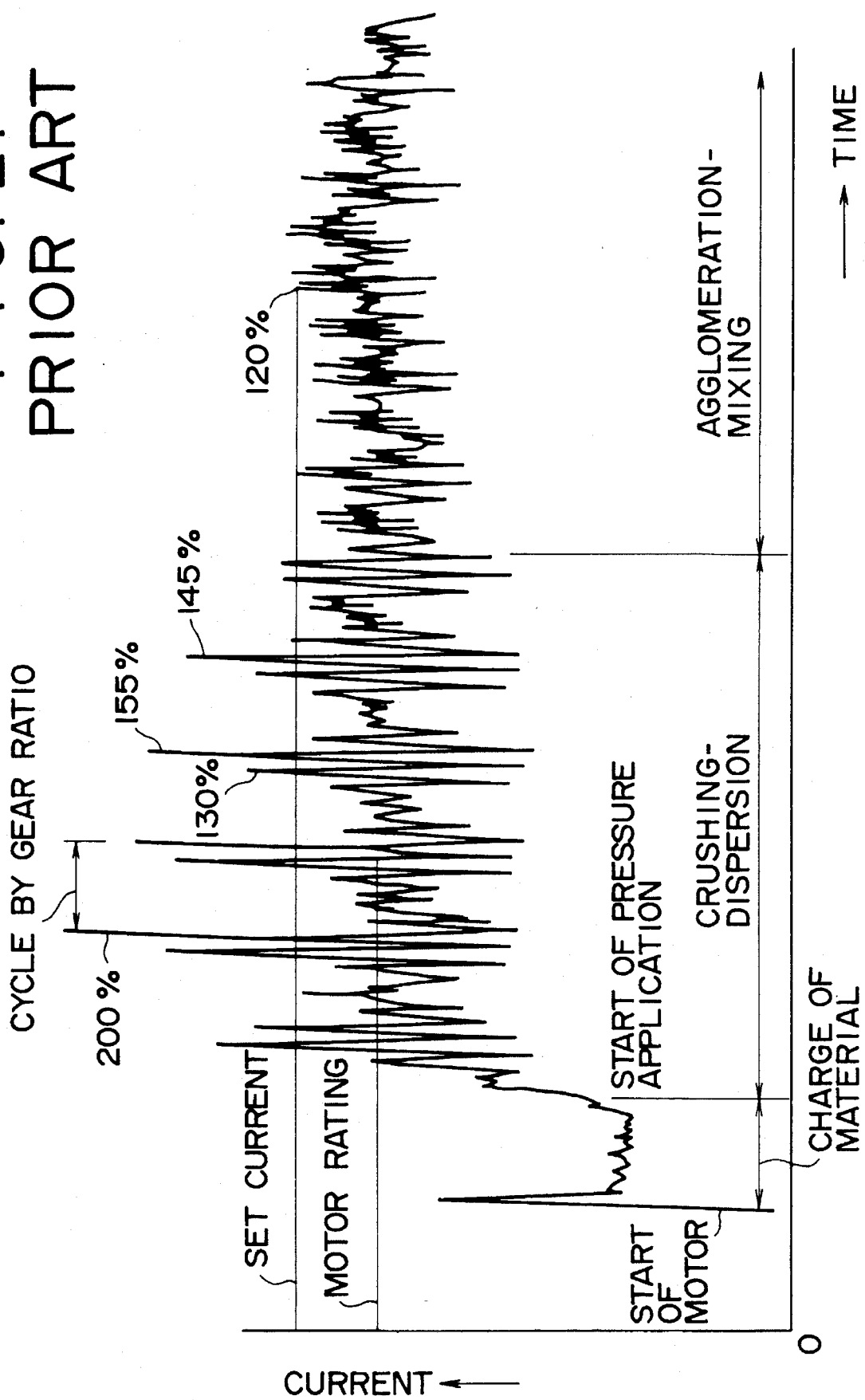

5,460,445

MIXER

BACKGROUND OF THE INVENTION

1. Field of the Invention

The present invention relates to a mixer for mixing of plastifiable materials mainly such as rubber and plastics materials.

2. Description of the Related Art

In this type of mixer, as shown in FIG. 17, a pair of rotors 5 and 6 are rotatably mounted in parallel and in opposite directions within a mixing chamber enclosed with a casing 2 and end frames 3A and 3B; a material charging opening 9 is provided in the top of the mixing chamber 4 and a force ram 10 for applying a pressure to charged materials is removably mounted in the material charging opening 9; the force ram 10 being connected to the outer end of a piston rod 12 of a ram cylinder 11 whereby the force ram 10 is installed and removed and the pressure is applied to the charged materials.

On the shafts 5A and 6A of both rotors 5 and 6 are fixedly installed a connecting pinion 7 and a connecting gear 8 respectively. To the end of the shaft 6A of the connecting pinion 7 is connected a speed reducer 41, which is coupled to the output shaft of a main motor 42. To the ram cylinder 11, compressed air supply-exhaust tubes 15 and 16 are connected through ram-lift changeover solenoid valves 13 and 14. The solenoid valve 13 for the compressed air supply-exhaust tube 15 on the cylinder head side is designed to prevent overloading the motor 42 during mixing operation by cutting off a maximum load through de-exciting the solenoid valve 13 by the output of a contact-type ammeter 43 attached to the motor 42.

The rotors 5 and 6 are designed to be rotated in the illustrated directions by the pinion 7 and the gear 8 having no common measure. That is, the number of teeth on the pinion is not wholly divisible by the number of teeth on the other opinion. The phase of both rotors 5 and 6 changes correspondingly to the gear ratio (generally 1.1 to 1.2) of the pinion 7 and the gear 8, and the rotor power distribution chart, that is, the load current chart, of the motor 42 indicates as great a peak load as 130 to 200 percent during the initial period of pressure application, as shown in FIG. 21. As a result of tests, the range of material mixing by both rotors 5 and 6 is as shown in FIG. 18; it has been proved, however, that when the blade tips a and b of both rotors 5 and 6 face inwardly toward each other (phase difference 0 degree) as shown in FIG. 19(a), there occurs the maximum load (maximum peak current), and then a next greatest load (peak current) in the vicinity (see FIG. 19(b)) of this combination.

That is, in FIG. 19(b), when the phase difference of the rotor 5 is within the range of θ1 to θ2, the peak current occurs; and as is clear also from the chart in FIG. 21, the current value is 120 percent or less when both θ1 and θ2 are 45 to 90 degrees in relation to the 100-percent rated current of motor, 180 to 200 percent when θ1 and θ2 are 0 to 10 degrees, 140 to 150 percent when both θ1 and θ2 are 15 to 20 degrees, and 120 to 130 percent when both θ1 and θ2 are 25 to 45 degrees. Therefore, a conventional set current on the ammeter 43 is 120 percent of the rated current of the motor.

Pressure application by the force ram 10 to the material M charged into the chamber 4 starts as shown in FIG. 20(a), moving the force ram 10 downwardly with the compressed air supplied to the head side chamber 11A of the ram cylinder 11 through the solenoid valve 13 and the air supply-exhaust tube 15 to thereby apply the pressure to the material. The charge of the material is generally of the order of 70 percent of the volume of the chamber 4. Since the apparent specific gravity of the material is small, the force ram 10 stops halfway without going downwardly as low as the bottom dead center.

The material that has entered both rotors 5 and 6 is crushed and mixed, being gradually forced by the force ram 10 as the specific volume of the material M increases. There occurs a difference in mixing between a material previously supplied and a material subsequently supplied to both rotors 5 and 6, the difference becoming a cause of spotty quality. Some material M1 remains unmoving on the lower surface of the force ram 10 and in a space S (see FIG. 20(b)) outside of the working radius R (see FIG. 17) of both rotors 5 and 6.

According to a prior technique, the force ram 10 is automatically or manually moved upwardly at a specific material mixing time and temperature, to thereby move the material M1 staying in the space S, thus agitating, and giving cuts to, the material in order to prevent uneven mixing.

In the above-described prior technique, there has been such a disadvantage that an excessive load occurs to give damage to the rotor drive system when the phase angles θ1 and θ2 of both of the rotors 5 and 6 are 0 to 2 degrees. Since a peak overload occurs at approximately one-fourth a turn of both rotors 5 and 6 even if the pressure of the force ram 10 is released at the time of peak overload, no conventional means can quickly release the pressure, and immediately cope with the peak overload. There exists such a disadvantage, therefore, that the mixer is required to be provided with a powerful drive system, and that the mixing effect will be reduced.

SUMMARY OF THE INVENTION

In view of the above-described disadvantages inherent in the heretofore known techniques, it is an object of the present invention to provide a mixer which is capable of preventing an overload, decreasing the weight of the machine as well as the drive system to thereby lower production cost, preventing damage to the machine, and improving the mixing effect to obtain uniform quality of a mixed compound.

In the present invention, the following technological means are incorporated in order to attain the above-described object.

That is, the invention features that, in the mixer including a pair of rotors within a mixing chamber enclosed with a casing and an end frame, and a force ram fitted in the material charging opening and fed downwardly to apply a pressure to a material in the chamber, the number of teeth of connecting pinion and gear fixedly mounted, in mesh with each other, on the shafts of both rotors is a measure; and furthermore the phase angle of these rotors is set at 25 to 45 degrees.

The invention further features that the gear ratio of the connecting pinion and the connecting gear is 1.

The invention further features that, in a mixer having a pair of rotors which are rotatably mounted in opposite directions within a mixing chamber enclosed with a casing and an end frame, and a force ram which is fitted in the material charging opening and lowered to apply a pressure to the material in the chamber, the pressure of the force ram is released instantly when the blade tip of each rotor has come to a chamber end position after the detection of the rotor phase.

The invention further features that, in a mixer which includes a pair of rotors rotatably mounted in opposite directions within a mixing chamber enclosed with a casing and an end frame, and a force ram fitted in the material charging opening and lowered to apply a pressure to the material in the chamber, the force ram pressure is released for a required duration when the rotor phase has come within a specific range in which the rotor drive motor load reaches a peak value after the detection of the rotor phase.

The invention further features the classification of the load of the rotor drive motor into a plurality of classes, so that the force ram pressure will be detected and controlled in accordance with the classes thus classified.

The invention further features the provision of a control device which detects in advance that the phase of both rotors comes within a specific range, to thereby release the force ram pressure, with the time from the release of the force ram pressure until actual pressure drop taken into consideration.

The invention further features the provision of a bypass circuit through a bypass valve between working fluid supply-exhaust lines extending to the ram cylinder of the force ram.

The invention further features the provision of a pressure reducing valve in the bypass circuit.

Furthermore, the invention further features the direct supply of a pressure releasing fluid to the fluid chamber on the pressure releasing side of the force ram cylinder.

According to the invention, it is possible to prevent the rotor phase angle (0 to 20 degrees) at which the peak overload occurs, to thereby prevent the overload, by using a divisible number of teeth for either of the connecting pinion and connecting gear and by setting the phase angles of the blade tips of both rotors at 25 to 45 degrees.

According to the invention, if the gear ratio is 1, the speed ratio of both rotors is also 1; that is, both of the rotors turn at the same speed, performing the same mixing operation to produce a mixed compound of uniform quality. Besides, since the phase difference of these rotors can be fixed within the range of 45 to 135 degrees, the load current at peak operation becomes 120 percent or less, thereby preventing the overload.

Furthermore, according to the invention the force ram pressure is instantly released before the phase angle of the rotors becomes an angle (0 to 20 degrees) at which the load reaches a peak value, and the amount of the material to be brought into the chamber by the rotors decreases, thereby reducing the load current to prevent the overload. Thus the material being mixed comes to move freely to allow repetition of active agitation and cuts, thus enhancing the mixing effect to remove the material remaining immediately under the force ram. When the phase difference between the two rotors has exceeded the range of peak overload, the force ram starts moving downwardly again to apply the pressure to the material to be mixed.

According to the invention, when the phase difference between the two rotors has come into the range of peak load of the rotor drive motor, the force ram pressure is released for a set period of time, during which the amount of material to be brought into the chamber by the rotors decreases and accordingly the load current lowers, thus preventing the occurrence of overload. In addition, the motion of the material being mixed becomes free, allowing active cuts and agitation to thereby gain an improved mixing effect. Furthermore, when the phase difference of both rotors has exceeded the peak load range, the force ram moves downwardly again to apply the pressure to the material being mixed.

According to the invention, the force ram pressure is controlled in accordance with the peak load classification, maintaining the chamber pressure at a proper value to obtain an optimum mixing cycle.

According to the invention, since pressure releasing operation is done in advance, load smoothing is performed to receive the peak load with the ram pressure fully released.

And according to the invention, the working fluid in the chamber on the ram cylinder head side flows out rapidly to instantly release the ram pressure, and accordingly the rotors can operate in their proper positions, obtaining a great agitation effect.

According to the invention, the ram pressure can be controlled in accordance with a material to be mixed which does not require fully releasing the ram pressure, thereby preventing prolongation of mixing time and improving producibility.

Furthermore, according to the invention a large amount of working fluid can be supplied rapidly into the fluid chamber on the pressure releasing side of the ram cylinder, instantly releasing the force ram pressure to prevent the overload correspondingly to the peak load timing.

Furthermore, the material being mixed comes to move freely, being repetitively cut and agitated.

BRIEF DESCRIPTION OF THE DRAWINGS

The above and other objects, features and advantages of the present invention will be more clear from the following description with reference to the accompanying drawings, in which:

FIG. 1 is a partially omitted plan view showing an embodiment of the present invention;

FIG. 2 is a longitudinal sectional side view of FIG. 1;

FIG. 11 is a view showing a relation between the phase, phase angle, and speed of both rotors and motor current values;

FIG. 21 is a power distribution chart of the rotor drive motor.

DESCRIPTION OF THE PREFERRED EMBODIMENTS

Preferred embodiments of a mixer according to the present invention will hereinafter be explained with reference to the accompanying drawings.

Figures 3, 4:
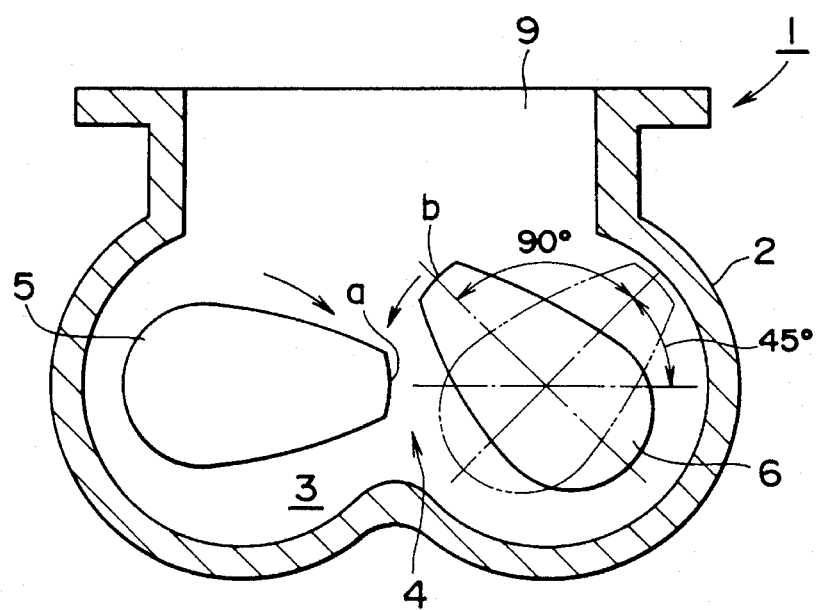
FIG. 3 is a view showing a relation between the phase of both rotors and the rotor speed in the same embodiment.
FIG. 4 is an explanatory view of a variation of the present invention.

FIGS. 1 to 3 show the embodiment of the present invention claimed in claim 1. In a mixer 1 a pair of rotors 5 and 6 are rotatably mounted in parallel with each other and in opposite directions within a mixing chamber 4 which is enclosed with a casing 2 and end frames 3A and 3B; on the outer ends of rotor shafts 5 and 6 are fixedly mounted a connecting pinion 7 and a connecting gear 8 which are engaged with each other; and to the other ends of the rotor shafts 5 and 6 on the connecting pinion 7 side, a speed reducer and a drive motor (not shown) are connected as in a conventional mixer.

In the top part of the chamber 4 is provided a material charging opening 9, at which the force ram 10 for pressure application to the material to be mixed is removably mounted. The ram 10 is driven by a ram cylinder (not shown), to apply the pressure.

The two rotors 5 and 6, as shown in FIG. 2, are so arranged that the blade tip (a) of one rotor 5 is at 0 degrees while the blade tip (b) of the other rotor 6 is at θ1 degrees. In this state the connecting pinion 7 and the connecting gear 8 are in mesh. The number of teeth (N1) of the connecting pinion 7 is 30 and the number of teeth (N2) of the connecting gear 8 is 36 one of, which is a whole multiple of the other. Therefore the phase difference θ of these rotors 5 and 6 will be given by $$(N2-N1)/N2 \times 360° = (36-30)/36 \times 360° = 60°.$$

Because θ1=½θ, that is, θ1=30°, both the phase differences θ1 and θ2 are set to 30 degrees at the time of assembling the rotors 5 and 6.

According to the above-described embodiment, since the phase difference θ of the rotors 5 and 6 is always an integral multiple of 60 degrees, the phase of the rotors 5 and 6 relative to the speed (N1) of the rotor 6 will become as shown in FIG. 3. Therefore, it is possible to prevent especially the range of the phase 0 to 20 degrees where an excessive load occurs, by fixing the phases θ1 and θ2 of the rotors 5 and 6 within the range of 25 to 45 degrees.

If in the above-described embodiment, the gear ratio of the connecting pinion 7 and the connecting gear 8 (N2/N1) of both rotors 5 and 6 is set at 1, there would exists no speed difference between both rotors 5 and 6; that is, these rotors rotate at the same speed, thus allowing the rotors to perform the same mixing operation to produce a mixed compound of uniform quality in the chamber; and moreover the peak load current decreases to 120 percent or less to thereby prevent the occurrence of overload.

FIG. 4 shows an example, with the gear ratio of the pinion 7 and the gear 8 (N2/N1) set at 1 and with the blade tip (a) of the rotor 5 set at 0 degree while the blade tip (b) of the rotor 6 set at 45 to 135 degrees. In this case, the phase difference is within the range of 45 to 135 degrees, from which we can expect the same effect as in the preferred embodiments of the invention.

Figure 5:
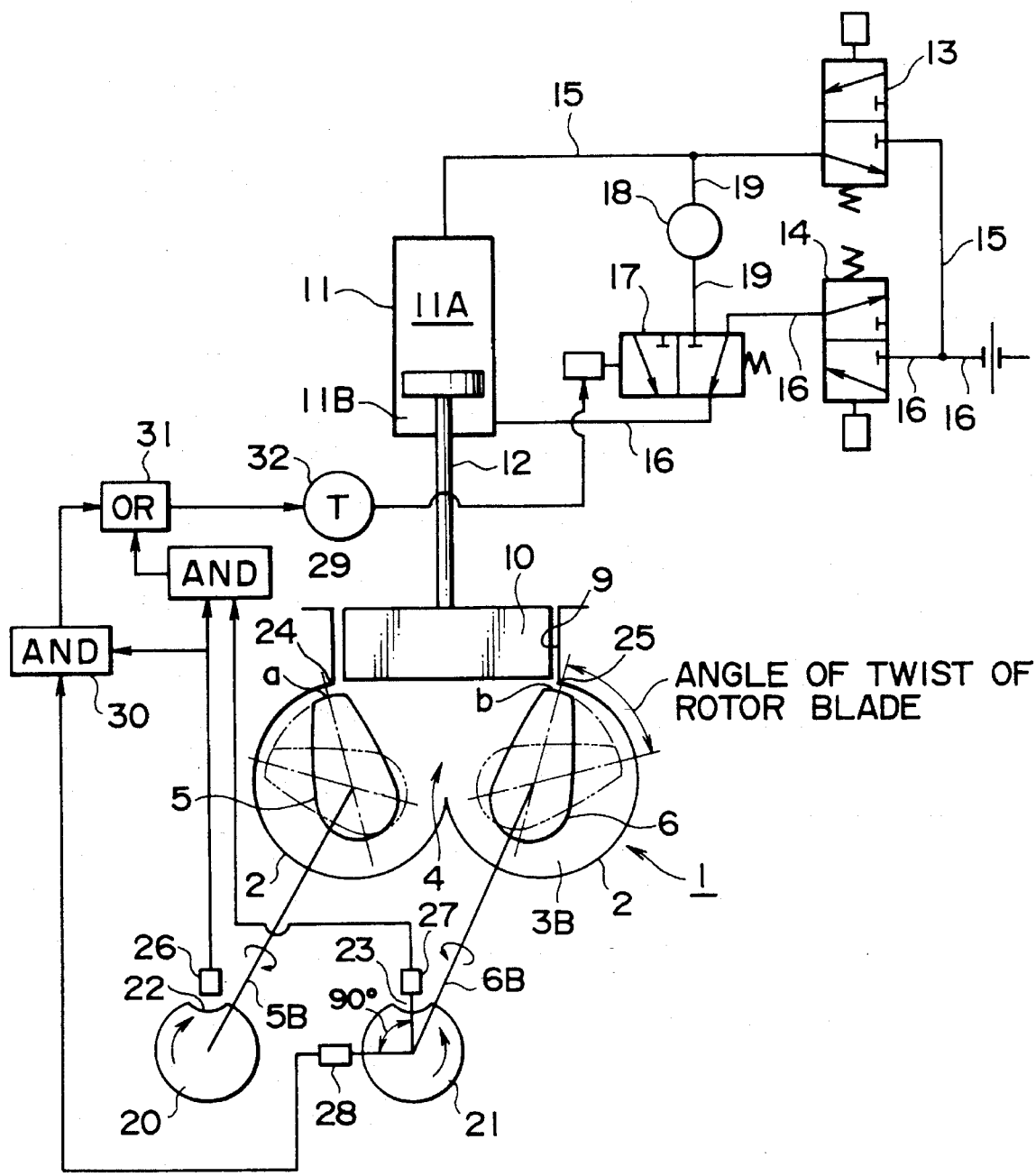
FIG. 5 is a block diagram showing an embodiment of the present invention.

FIG. 5 shows an embodiment of the present invention, wherein the basic construction of the mixer 1 is the same as that shown in FIG. 1. In addition the force ram 10 is connected to the outer end of the piston rod 12 of the ram cylinder 11; to the fluid chamber 11A on the head (pressurizing) side and the fluid chamber 11B on the rod (pressure-releasing) side are connected working-fluid supply tubes 15 and 16 via fluid-passage changeover solenoid valves 13 and 14 respectively; and between the ram cylinder 11 connected with both supply tubes 15 and 16 and the solenoid valves 13 and 14 is connected a bypass tube 19 via the bypass valve 17 (solenoid valve) and a pressure reducing valve 18.

On the shafts 5B and 6B are fixedly mounted rotor position detecting disks 20 and 21, which are provided with cutouts 22 and 23 respectively, in positions opposite to the blade tips (a) and (b) of the rotors 5 and 6. Position detecting sensors 26 and 27 for detecting the positions of the blade tips (a) and (b) are provided in positions corresponding to chamber ends 24 and 25 where the material charging opening 9 meets the casing 2. And a rotor position detecting sensor 28 is provided in a 90-degree advanced position of the rotor 6 (in a position 90 degrees ahead of the sensor 27).

The output of the sensors 26 to 28 is fed the bypass valve 17 through AND gates 29 and 30, an OR gate 31, and a pressure release timer 32. The rotors 5 and 6 are so set that their blade tips (a) and (b) may be simultaneously positioned oppositely to the chamber ends 24 and 25 respectively. The cutouts 22 and 23 of the detecting disks 20 and 21 are adjustable in the angle of position as desired in accordance with a time lag of the system.

Figure 6:
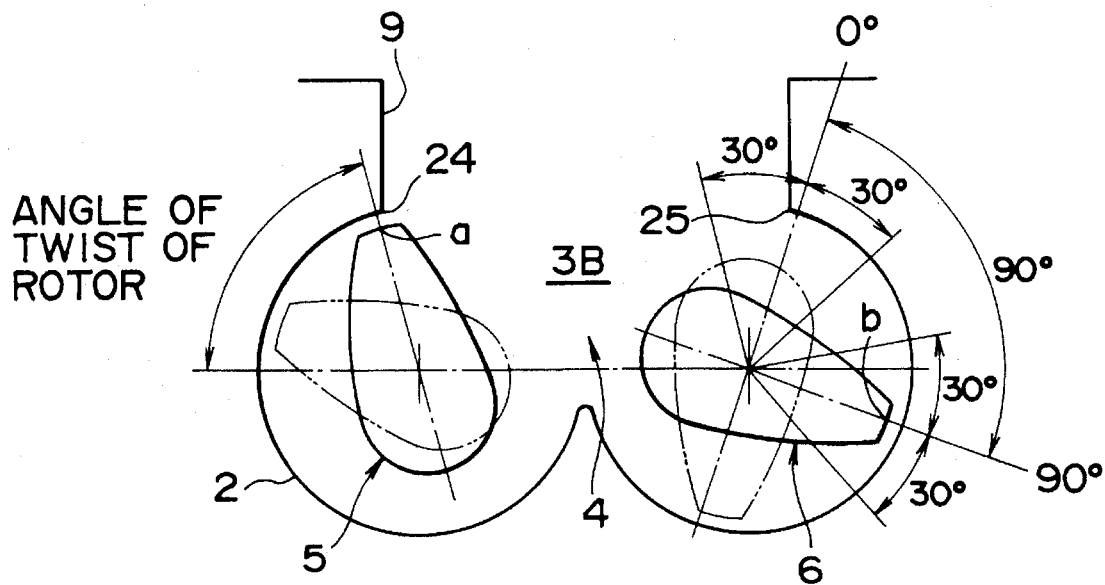
FIG. 6 is an explanatory view of a set position of rotor blade tips.

The reference position of the blade tip (b) of the rotor 6, as shown in FIG. 6, has symmetry with respect to the position of the blade tip (a) of the rotor 5 and is set at a reference position 0).

In the embodiment of the present invention, after the material is charged into the chamber 4, the force ram 10 is forced downwardly into the charging opening 9 and the solenoid valve 13 is excited to supply the compressed air into the fluid chamber 11A on the head side to mix the material under pressure. Then, when the blade tip B of the rotor 6 has appeared simultaneously (as shown in FIG. 5) with the appearance of the blade tip C of the rotor 5 from the chamber end 24 (FIG. 7), or 90 degrees after the reference position (FIG. 6), the rotor position detecting sensors 26 and 27 or 26 and 28 operate (actually, operate to detect a little earlier because of a time lag of the system), and with the solenoid valve 13 left excited, the bypass valve 17 is excited by the output of the sensors 26 and 27 or 26 and 28, allowing the inflow of the compressed air into the fluid chamber 11B on the rod side. Thus the pressures in both the upper and lower chambers 11A and 11B of the ram cylinder 11 become equal, to instantly release the ram pressure, with the result that only the weight of the force ram 10 is applied to the material being mixed.

Therefore, the pressure being applied to the material during mixing diminishes to allow the positive flow of the material by the twisted rotor blades, thereby enabling effective mixing and consequently preventing overload. A timer 32 has been set to one-half to one turn of the rotors 5 and 6. When the set time of the timer 32 is over, the bypass valve 17 is simultaneously de-excited, and the compressed air is supplied into the fluid chamber 11A on the head side and at the same time driven out of the fluid chamber 11B on the rod side, and subsequently the force ram 10 is fed downwardly to apply the pressure to the material again.

When the rotor position detecting sensors 26 and 27 have operated (when the blade tips (a) and (b) have appeared from the chamber ends 24 and 25 in FIG. 6), and when the timer 32 has been set to one-half turn of the rotors, both the blade (a) of the rotor 6 and the blade (d) of the rotor 5 operate simultaneously to give cuts to the material. Also, in the case the timer 32 is set to one turn of the rotor, the blade (b) and the blade (c) subsequently operate simultaneously. Then, when a change is made in the blade tip set position, the operation procedure stated above is reversed.

Furthermore, when the rotor position detecting sensors 26 and 28 have operated, the timer 32 is set to one turn of the rotor, and, as shown in FIG. 6, the blade (a), the blade (d), the blade (b) and the blade (c) are operated in the order of mention, thus repeating agitation and folding of the material. The duration of operation per cycle can be determined by means of the timer or a counter, to operate the sensors 26 and 27 during the first set time, and the sensors 26 and 28 during the second set time.

According to another embodiment of the present invention, the pressure of the force ram 10 is released 10 times faster than in a conventional case, to insure overload prevention. At the same time, the pressure can be released in a proper rotor position, thereby improving material cutting and agitating effect to enable uniform mixing. Moreover, the material will not remain immediately on the underside of the force ram 10, optimizing the mixing time to thereby improve producibility.

Furthermore, as shown in FIG. 5, the pressure reducing valve 18 is provided to enable regulating the degree of pressure release, and accordingly preventing the extension of the mixing time in mixing a material which requires no full release of the pressure, thus improving manufacturing productivity.

Figure 7:
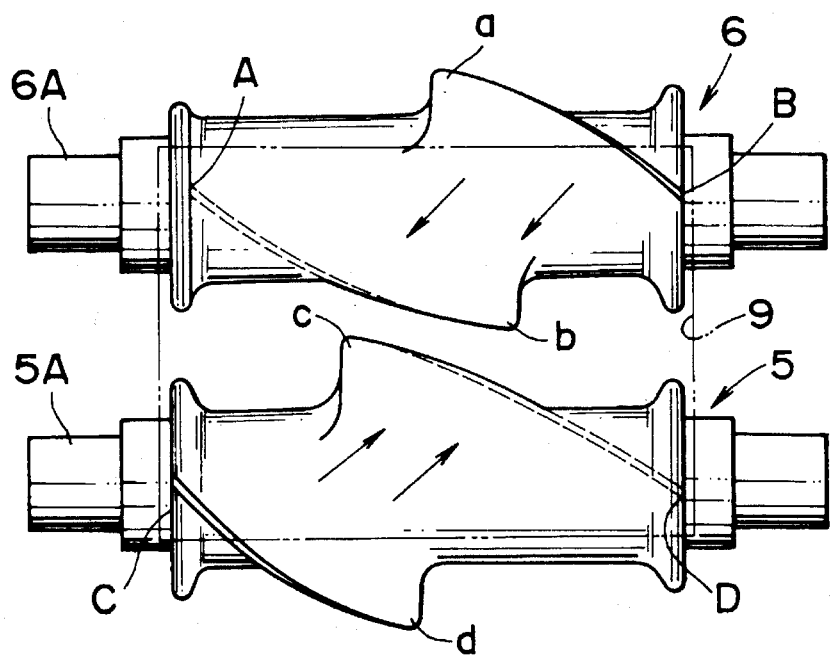
FIG. 7 is a plan view showing the state of engagement of both rotors.

In the above-described embodiment, the mixer can effectively perform cutting, agitating and folding operation, by properly setting the phase difference of assembly of the rotor 5 and 6, that is, by setting the blade tip C of the rotor 5 to 90 degrees and to the vicinity of 0 degree with respect to the blade tip B of the rotor 6 shown in FIG. 7. Namely, as shown in FIG. 6, the mixer has a great agitating and folding effect when the rotor blade tip C is within the range of 90°±30°, and also has a great cutting effect within the range of 0°±30°.

In the embodiment stated above, the solenoid valve 14 is excited with the solenoid valve 13 kept excited, and then, with the bypass valve 17 de-excited, the compressed air is supplied to the fluid chamber 11B on the rod side, thus releasing the pressure of the force ram 10.

Figure 8:
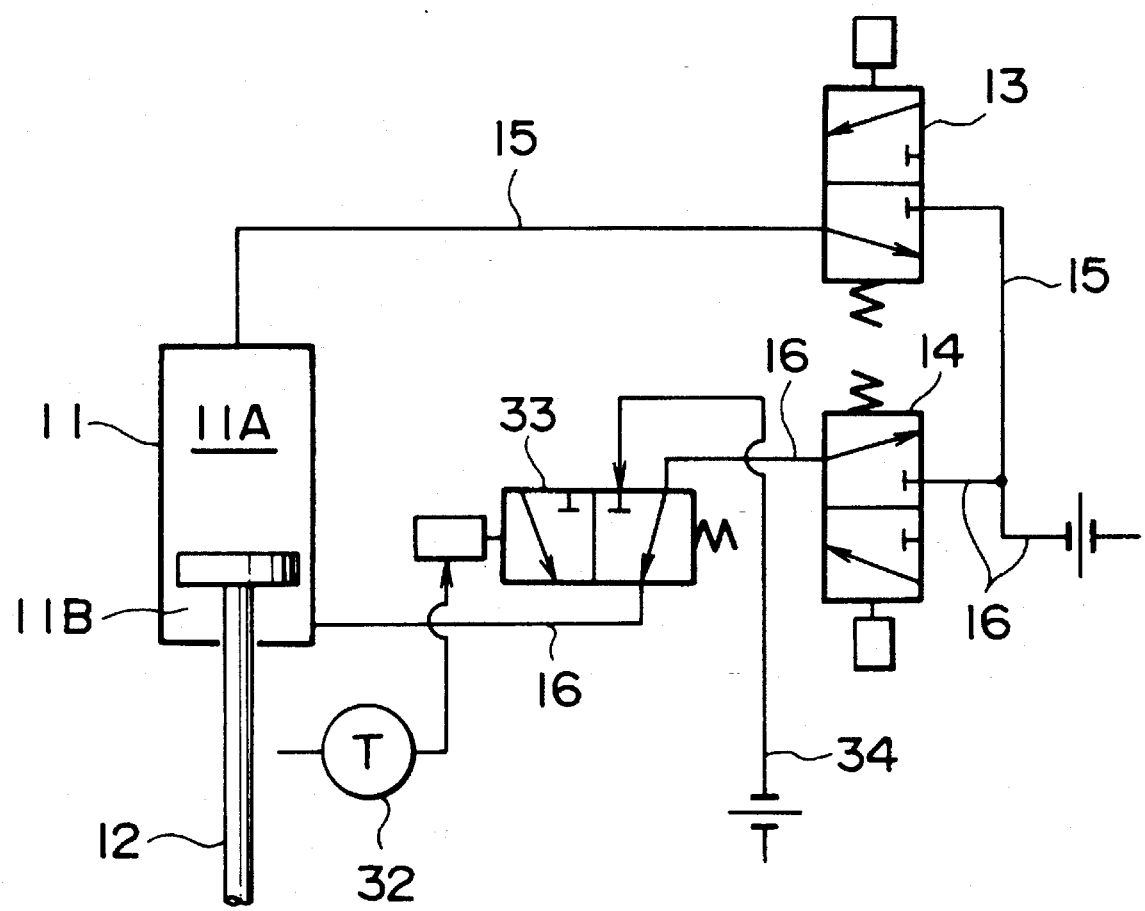
FIG. 8 is a block diagram showing one example of a feature of the present invention

FIG. 8 shows a separate external compressed air supply tube 34 which is connected with a changeover solenoid valve 33 connected with the working fluid supply-discharge tube 16 in place of a bypass tube 19; when the sensors 26 to 28 are operated to excite the changeover solenoid valve 33, the compressed air can be supplied into the fluid chamber 11B on the rod side through the changeover solenoid valve 33 from an external compressed air source, thereby releasing the force ram 10 pressure with the solenoid valve 13 kept in an excited condition.

Figure 9:
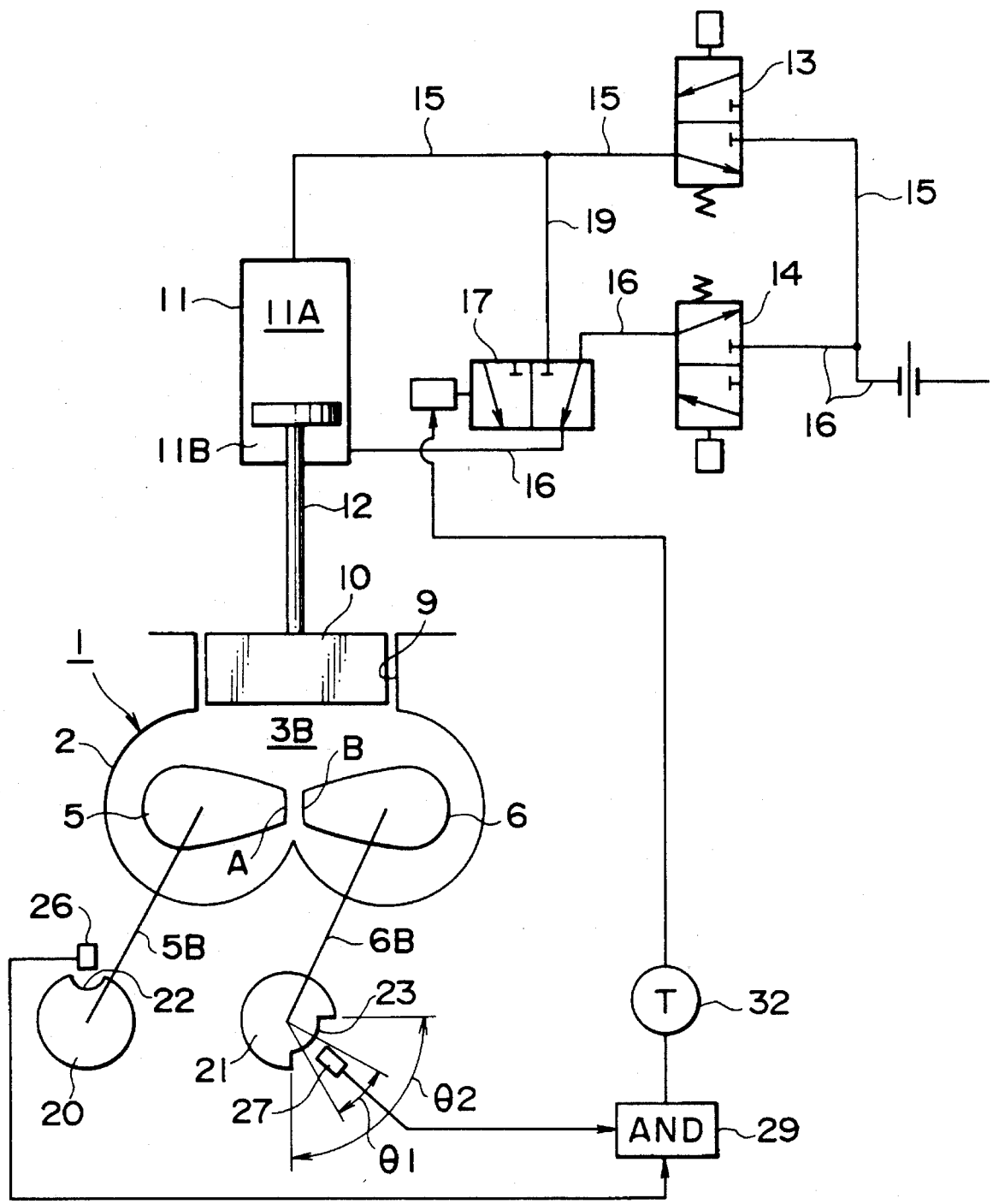
FIG. 9 is a block diagram showing another embodiment of the present invention.

FIG. 9 shows another embodiment of the present invention, wherein a difference from the previous embodiment resides in that the phases of the rotors 5 and 6 are detected, and when a phase difference has come within a given range in which the load current of the rotor drive motor reaches a peak value, the pressure of the force ram 10 is released only for a period of time required. Since the mixer is the same as that of FIG. 5 except for the absence of the rotor position detecting sensor 28, the AND gate 30, and the OR gate 31, and therefore the same reference numerals and terms are used for the same members, the features of which will be described hereinafter.

Figure 10:
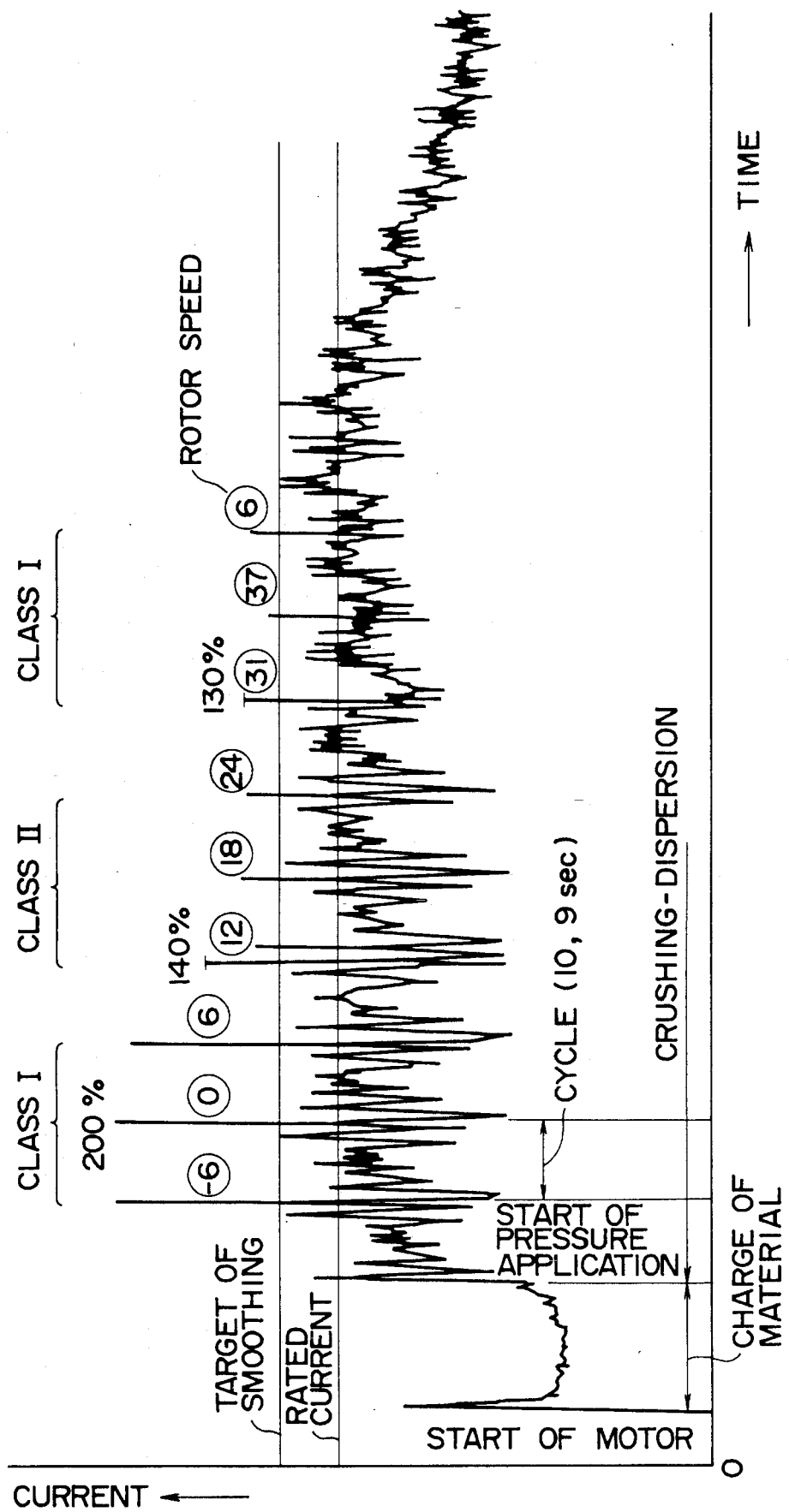
FIG. 10 is a load current chart of a rotor drive motor.

It is clear from a result of experiments that, during the initial period of operation of the mixer, the load current of the rotor drive motor is as great a peak load as 130 to 200 percent as shown in FIG. 10, and that these cycles are determined by the gear ratio of the connecting pinion and the connecting gear (FIG. 1), and the peak load current value also is determined by the phase difference of the rotors.

The phase of the blade tip B of the rotor 6 relative to the blade tip A of the rotor 5 is as shown in FIG. 11. In this case, the number of teeth of the connecting pinion is 31 and that of the connecting gear is 37. The phase difference has been set at 0 degree when the blade tips A and B of the rotors 5 and 6 are in opposite positions as shown in FIG. 9.

It is manifest (FIG. 12) that the load distribution can be classified into Class I and Class II on the basis of the speed of the rotor 5 by entering in FIG. 10 the speed of the rotor 5 and the current value (%) shown in FIG. 11. The rotor position detecting sensor 26 is so arranged as to operate when the blade tip A of the rotor 5 is at 0 degree, and the rotor position detecting sensor 27 is so arranged as to operate when the blade tip B of the rotor 6 is within the range of θ2; the rotor position detecting disk 21 is formed with the cutout 23 within the range of θ2.

In FIG. 9, θ1 is Class 1 load range, while θ2 is Class II full-load range.

In the above-described embodiment, when both the sensors 26 and 27 are operated simultaneously, that is, when there has occurred Class I or Class II load, the bypass valve 17 is excited by the output of the sensors 26 and 27 (with the solenoid valve 13 held excited), to supply the compressed air to the fluid chamber 11B on the rod side to release the pressure of the force ram 10. Then, the bypass valve 17 is de-excited immediately after the lapse of the set time of the timer 32 (the duration of a quarter to one-half turn of the rotor), to supply the compressed air to the fluid chamber 11A on the head side and, at the same time, to discharge the compressed air from the fluid chamber 11B on the rod side, thereby applying the force ram 10 pressure to the material.

Figures 12, 13:
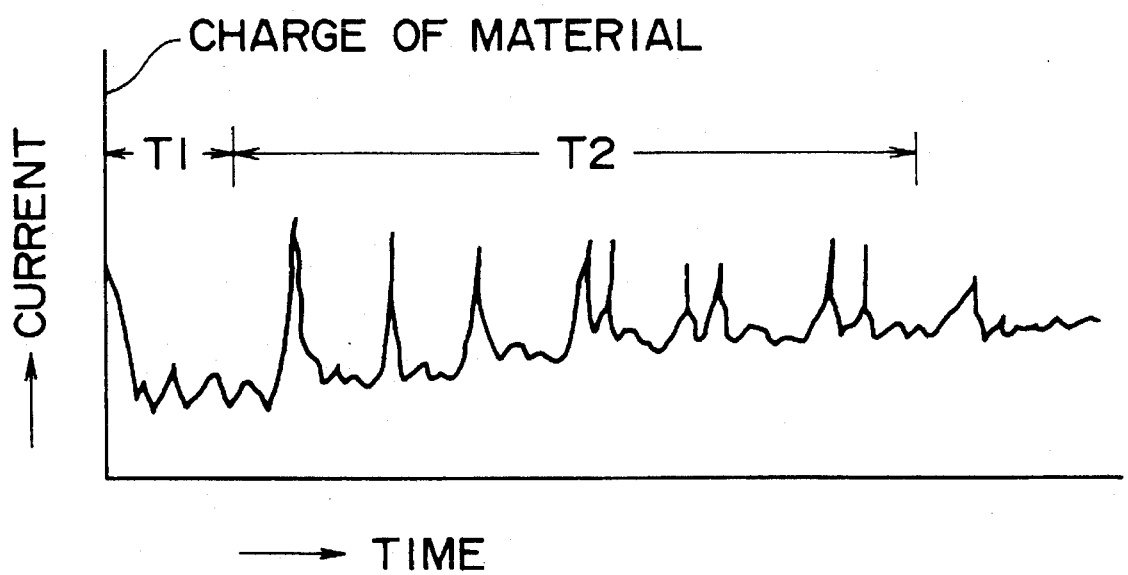
FIG. 12 is a view showing a relation between load classification and rotor speeds.
FIG. 13 is a view showing a peak load cutoff setting schedule.

The time to start pressure releasing operation and the range of pressure release (release time) are set by means of the timer 32, so that the rotors will operate only for the number of times of simultaneous correspondence of the sensors 26 and 27 within a given period of time (T2) after the lapse of the initial period of time (T1) after the charge of material as shown in FIG. 13. It is desirable that the sensors 26 and 27 be set to operate a little earlier with the time lag of the compressed air system taken into consideration.

According to this embodiment of the present invention, the peak load current is removed and smoothed to 110 percent of target load current, to thereby prevent the overloading of the mixer 1 as indicated by a peak load current cutoff setting schedule in FIG. 13. It is, therefore, possible to reduce the safety factor of the machine to (110%), enabling substantial reduction of cost. Furthermore, it is possible to largely decrease an electric power cost because of the adoption of a system for power reception based upon a user's demand. As the pressure applied by the force ram 10 decreases, the amount of material to be brought into the chamber also decreases, thus lowering and smoothing the load current.

Figure 14:
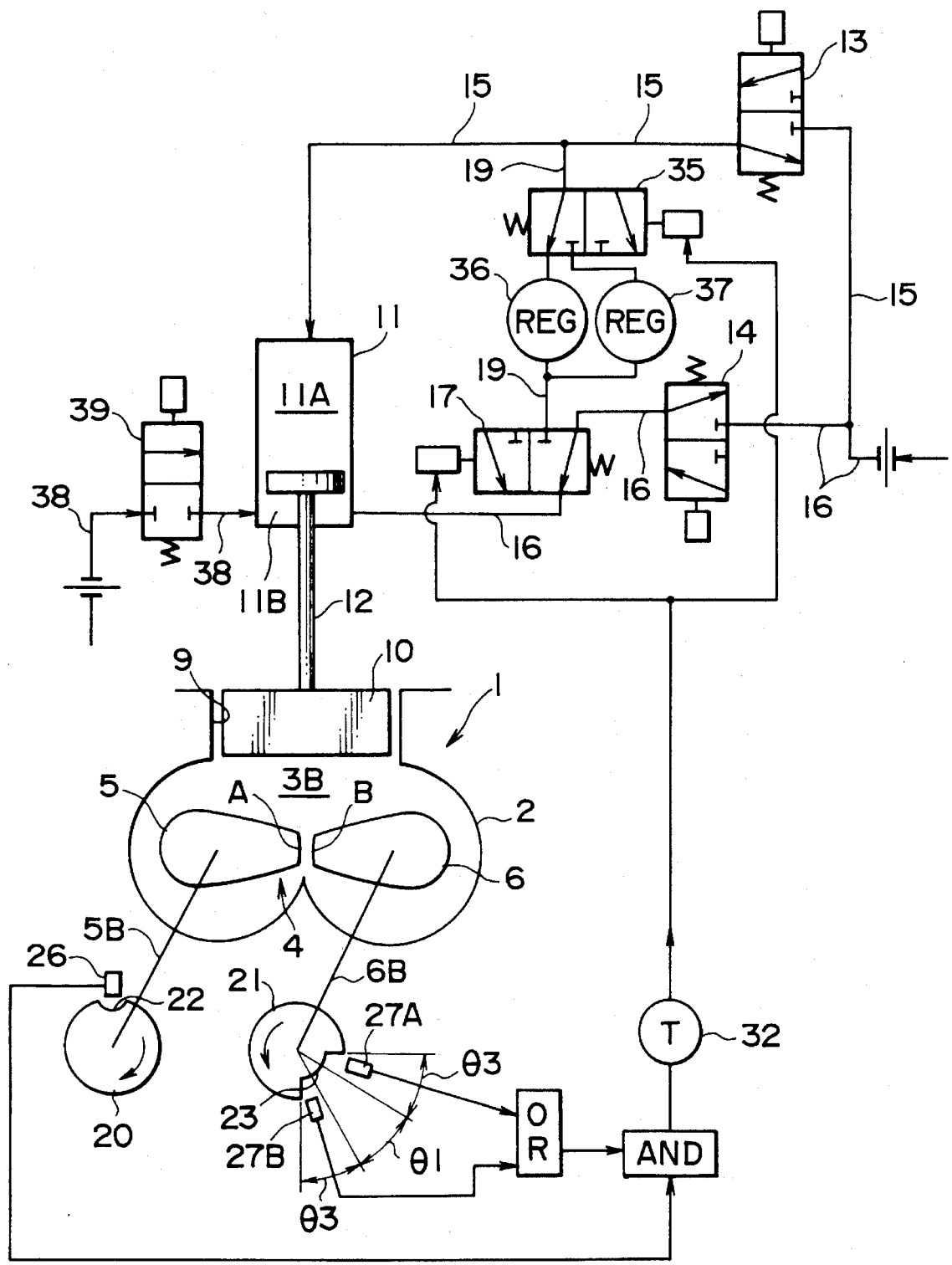
FIG. 14 is a block diagram showing another embodiment of the present invention.

FIG. 14 shows another embodiment of the present invention, wherein a difference from the previous embodiment of the present invention lies in the condition that a couple of position detecting sensors 27A and 27B of the rotor 6 are provided to detect rotor position within the Class II load range; the motor load is classified into Class I and Class II, and the bypass valve 17 and the high-low pressure changeover solenoid valve 35 mounted in the bypass tube 19 are excited by the output of both of either of the two rotor position detecting sensors 27A and 27B and the rotor position detecting sensor 26 of the rotor 5, thus supplying the compressed air under a lower pressure than that of Class I to the fluid chamber 11B on the rod side of the ram cylinder 11 to thereby maintain a slight pressure of the force ram 10.

When the set time of the timer 32 is over, the bypass valve 17 and the high-low pressure changeover solenoid valve 35 is de-excited and the air in the fluid chamber 11B on the rod side is discharged. At the same time, the compressed air is supplied into the fluid chamber 11A on the head side, restarting the force ram 10 to apply pressure to the material.

In FIG. 14, a reference numeral 36 denotes a high-pressure reducing valve, 37 is a low-pressure reducing valve, and 38 refers to an external compressed air supply tube which is connected to the fluid chamber 11B on the rod side and mounted with a solenoid switch valve 39, so that the compressed air can be supplied separately from the supply tube 38 to the fluid chamber 11B on the rod side to thereby instantly release the pressure of the force ram 10. Also, the use of the pressure reducing valves 36 and 37 can increase the internal pressure higher at the time of Class II load than at the time of Class I load, that is, can prevent the extension of mixing cycle by controlling the pressure of the force ram 10.

Figure 15:
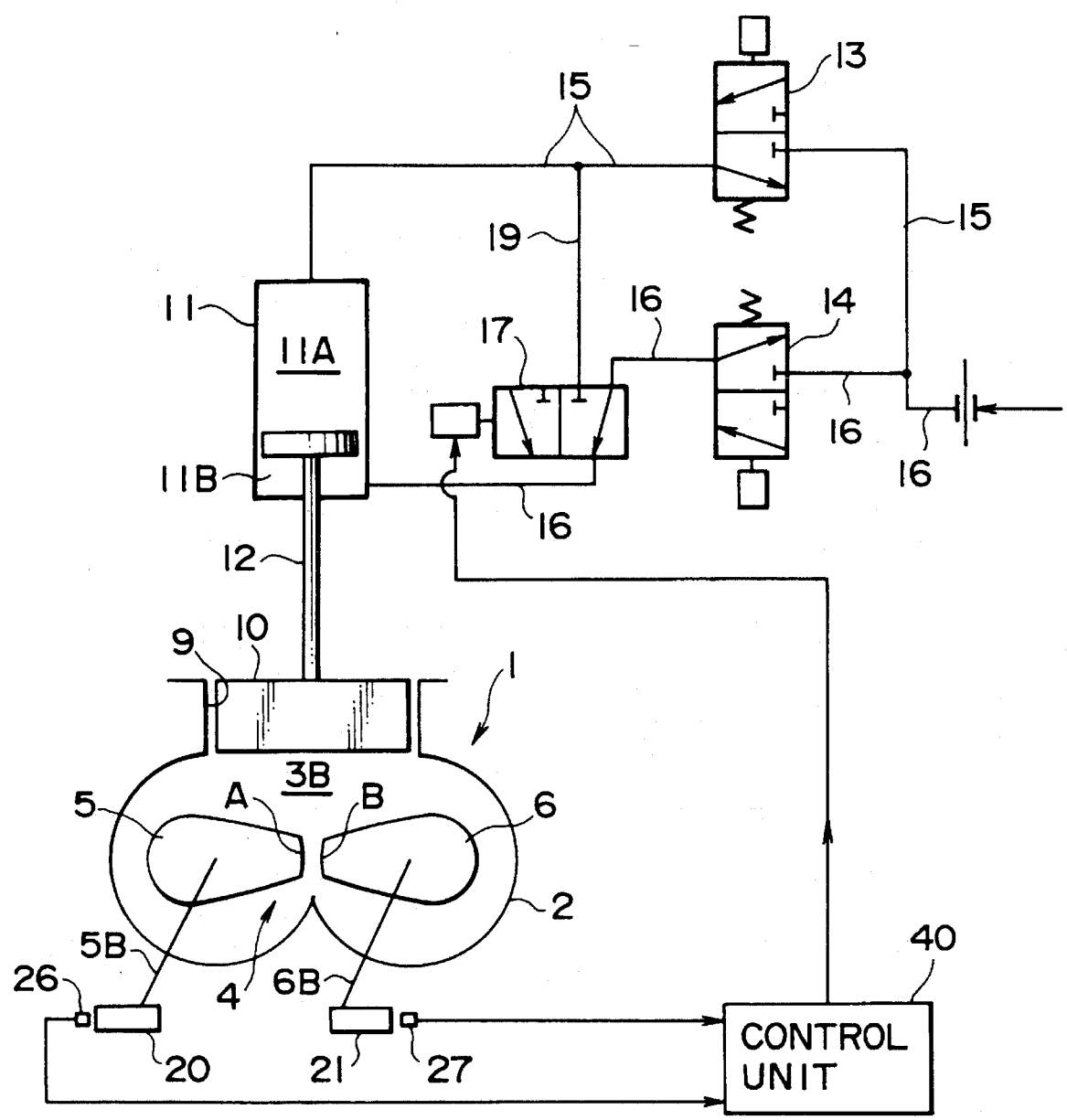
FIG. 15 is a block diagram showing another embodiment of the present invention.

FIG. 15 shows another embodiment of the present invention; its difference from the embodiment shown in FIG. 9 resides in that an output signal from the rotor position detecting sensors 26 and 27 of the rotors 5 and 6 enters the control unit 40, which in turn outputs to excite de-excite the bypass valve 17 to thereby release or apply the pressure of the force ram 10 to the material.

That is, the rotor position detecting sensors 26 and 27 are so arranged as to operate when the blade tips A and B of the rotors 5 and 6 are in the phase 0° shown in FIG. 15. The control unit 40 computes a phase difference at that time from a time lag of operation of the sensors 26 and 27 to predict the occurrence of a next Class I or Class II load shown in FIG. 10; when the load occurrence has been predicted, the pressure release timing is computed on the basis of a response time from the beginning of pressure release operation of the force ram 10 until the actual completion of pressure release and a rotor speed at this response time, so that the peak load may be received at a predicted timing at which the ram pressure applied has reached the lowest value, thereby releasing the ram pressure.

Figure 16:
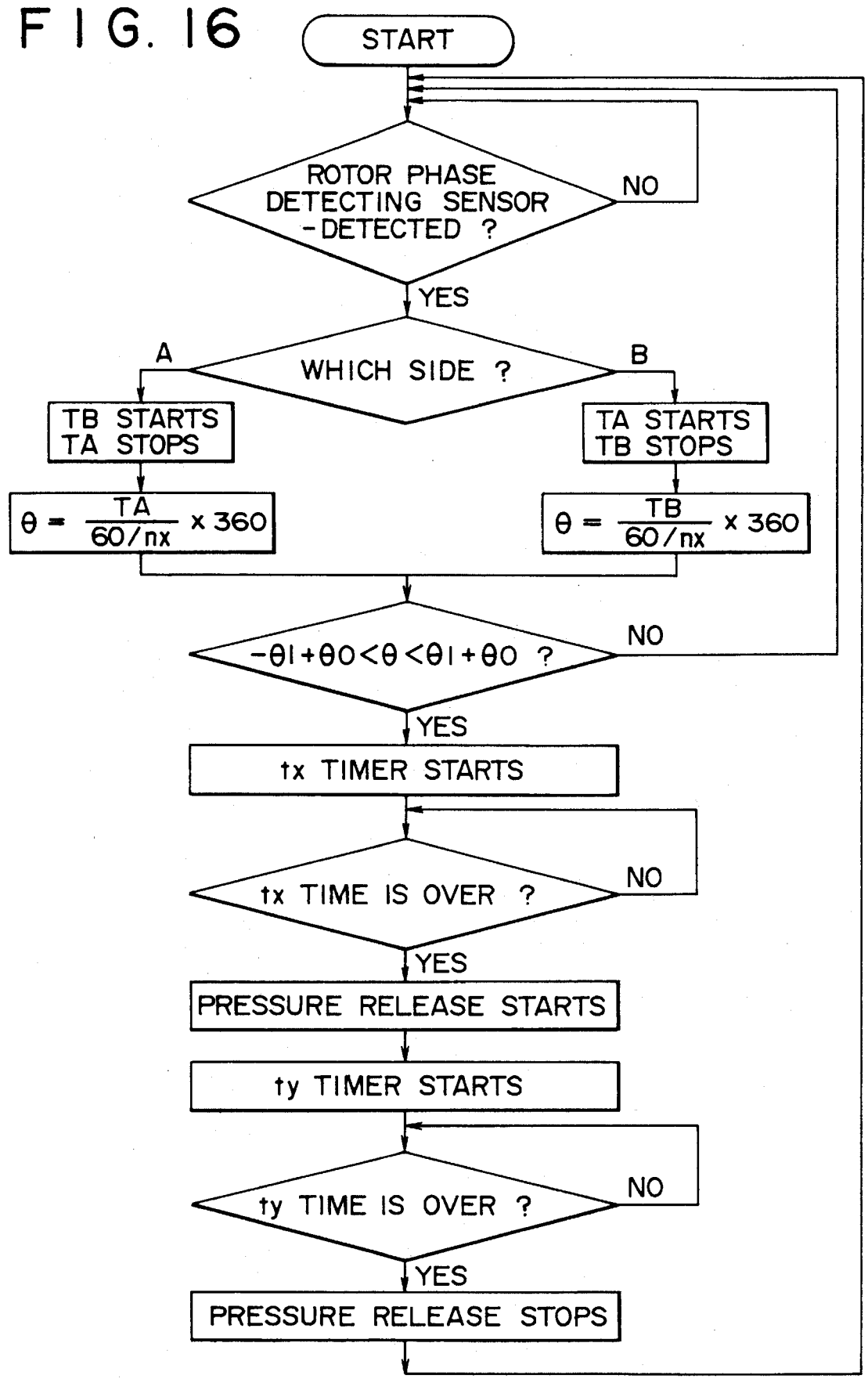
FIG. 16 is a flowchart of a control program of the same embodiment.
Figure 17:
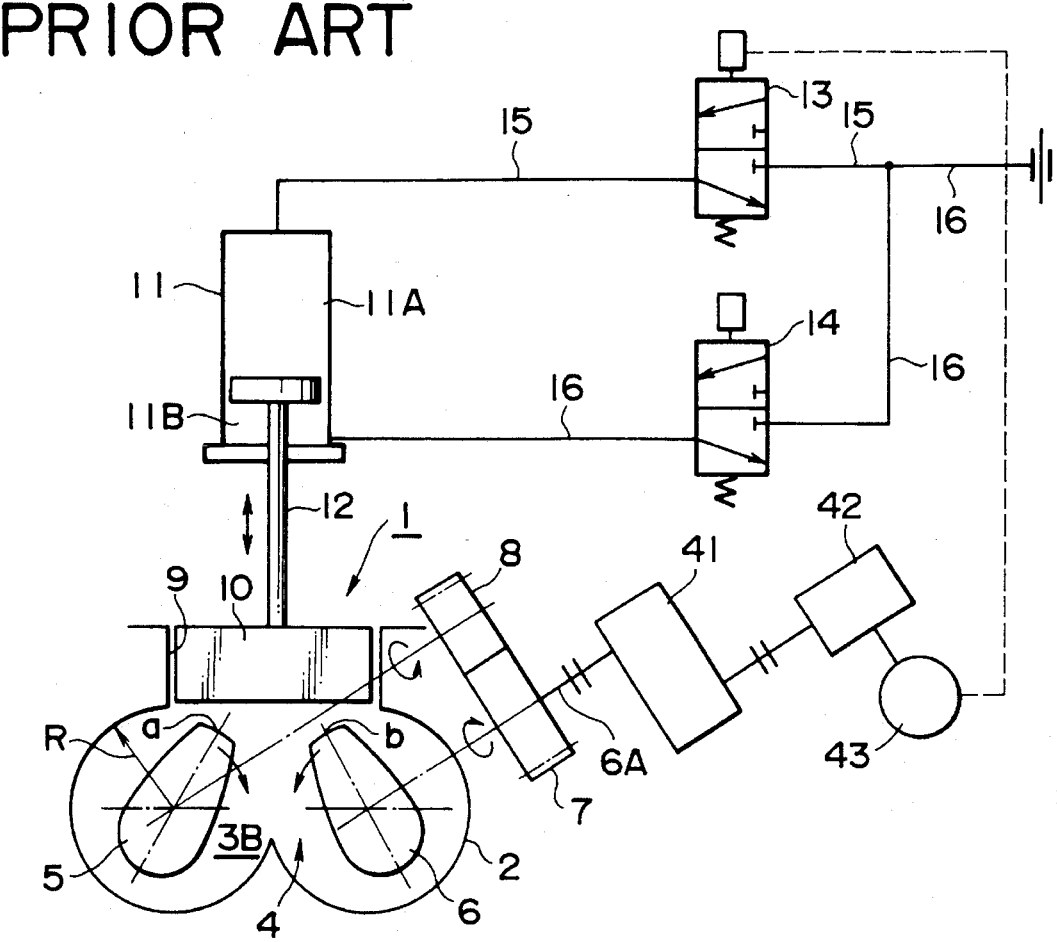
FIG. 17 is a block diagram showing an example of a conventional mixer.
Figure 18:
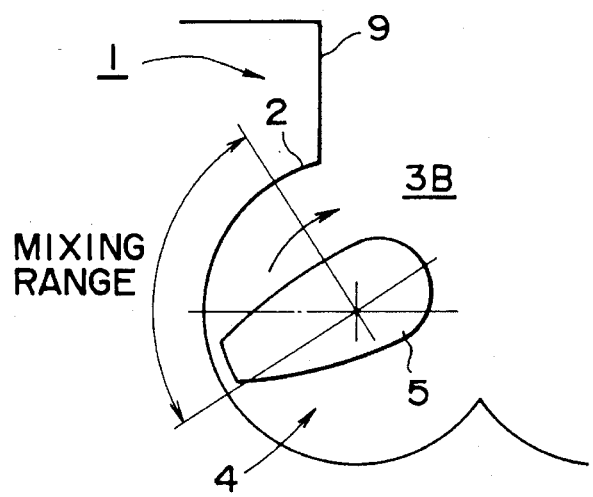
FIG. 18 is an explanatory view of a range of rotor mixing operation.
Figure 19A:
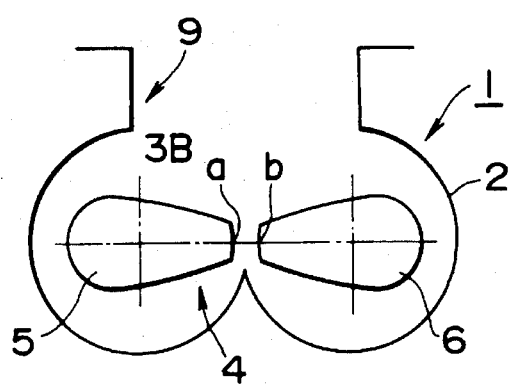
FIG. 19(a) is a view showing the phase of both rotors at a maximum peak load current.
Figure 19B:
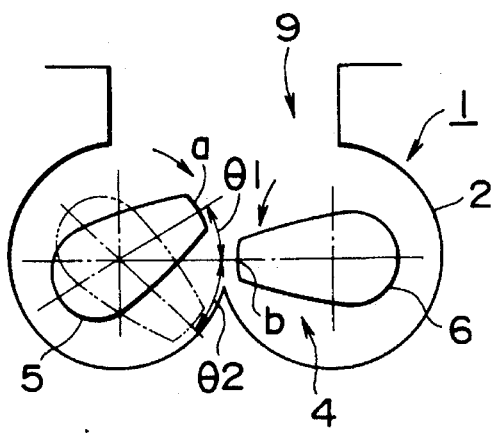
FIG. 19(b) is a view showing the phase of both rotors at a peak load current.
Figure 20A:
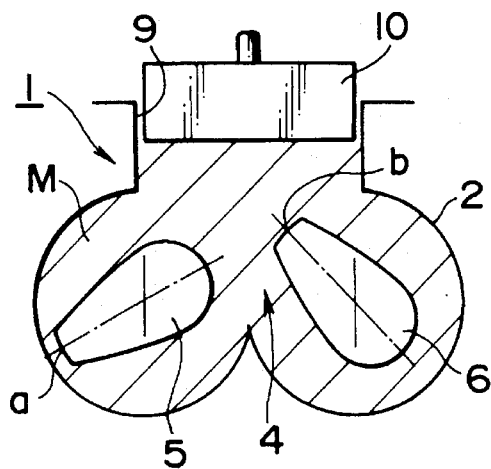
FIG. 20(a) is a view showing the state of a material charged into a mixer chamber immediately after pressure application.
Figure 20B:
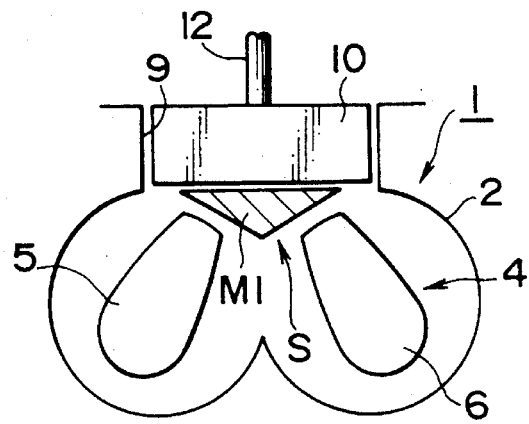
FIG. 20(b) is a view showing the state of the material after mixing.

FIG. 16 is a flowchart showing a pressure control program of the control unit 40, in which a timer TA sets a time from detection by the sensor 27 on the rotor 6 side to detection by the sensor 26 on the rotor 5 side, and a timer TB sets a time from detection by the sensor 26 on the rotor 5 side to detection by the sensor 26 on the rotor 6 side.

In FIG. 16, the character n is the number of revolutions of the rotor 5, whose speed ratio x to the number of revolutions n1 of the rotor 6 is fixed at n1/n>1. T refers to a response time until the ram pressure decreases to 0; $\theta$ refers to the phase angle of the blade tip B of the rotor 6 when the blade A of the rotor 5 reaches 0 degree; $\theta 0$ is the phase advance angle (fixed for each mixer) of the rotor 6 during one rotation of the rotor 5; and $\theta 1$ expresses the phase angle (fixed for each mixer) at which the peak load is predicted.

When the phase angle $\theta$ is $-\theta 1+\theta 0<\theta<\theta 1+\theta 0$, it is expected that the load reaches a peak value after one rotation of the rotor S; therefore the peak load time TO becomes 60/n.x (sec), and the force ram 10 is to be so set as to start releasing the pressure after tx=(TO)−(T) (sec). Here, ty refers to the pressure release time (since the pressure release is started at the peak of load, usually ty=T, which, however, must be adjustable according to the type of mixing). The timing T1 and T2 at which the phases of the rotors 5 and 6 are detected are set in accordance with the peak load cutoff setting schedule shown in FIG. 13.

According to the above-described embodiment, in the pressure release process, the time T1 from the charge of the material until peak load cutoff and electric energy, the temperature and electric power at which peak load cutoff is to be effected, and peak load cutoff frequency or time T2 are set between peak load cutoff and the discharge of material which has been charged into the chamber 4.

According to an embodiment of the present invention, when the chamber pressure has decreased with the release of the force ram 10 pressure, the amount of material to be taken into the chamber 4 by the rotors 5 and 6 diminishes, resulting in a decrease in the load current of the motor. Then, detecting the peak load in advance, the force ram 10 starts releasing the pressure; therefore the peak load timing is received at the time of completion of pressure release, thereby smoothing the load to the optimum value and consequently preventing the occurrence of overload.

In this embodiment of the present invention, the load is classified into Class I and Class II, according to which the load is detected to control the force ram 10 pressure; and it is possible to set the pressure release timing by using other mixing parameters (electric power, temperature, and time) as conditions. Prolongation of a cycle time likely to be caused by decreasing the internal pressure of the chamber 4, can be prevented by decreasing the pressure releasing frequency by restricting it by the use of other conditions, or by classifying the pressure by the load Class I and Class II.

While preferred embodiments of the present invention are shown and described hereinabove, it will be understood that the present invention is not to be limited thereto, since many modifications and changes may be made therein.

The present invention, being of the aforesaid constitution, has the following advantages.

The present invention features a mixer having a pair of rotors rotatably mounted in opposite directions within a mixing chamber enclosed with a casing and an end frame and a force ram fitted in a material charging opening and fed downwardly to apply the ram pressure to the material in the chamber. In the mixer, the number of teeth of either of a connecting pinion and a connecting gear which are fixedly mounted, in mesh with each other, on the shafts of these rotors, is a measure, and the phase angle of these rotors has been set at 25 to 45 degrees, thereby enabling lowering safety factors of the drive system, reducing the weight of the machine to lower a machine cost, lessening a fatigue stress of the rotors to obviate a danger of breakage of the rotors, and adopting a system for power reception based upon a user's demand in order to reduce a power receiving cost and to decrease peak power; and furthermore the mixer, being an electromechanical apparatus, has substantial room for strength to improve durability.

If the present invention features the gear ratio 1 of the connecting pinion and gear, the rotors turn at the same speed and accordingly can perform uniform mixing operation, thus producing a mixed compound of uniform quality and reducing the peak load current to 120 percent or less.

The present invention features a mixer having a pair of rotors rotatably mounted in opposite directions within a mixing chamber enclosed with a casing and an end frame and a force ram fitted in a material charging opening and fed downwardly to apply the ram pressure to the material in the chamber. In the mixer, the force ram pressure can be released instantly upon the detection of the rotor phases and the arrival of the blade tip of each rotor at the chamber end position; it is, therefore, possible to instantly release the force ram pressure, to prevent overload, and also to largely improve the material mixing effect to insure uniform mixing, thus preventing the material from remaining immediately on the underside of the force ram and consequently optimizing the mixing time for the purpose of obtaining higher producibility.

The present invention features the mixer having a pair of rotors rotatably mounted in opposite directions within a mixing chamber enclosed with a casing and an end frame and a force ram fitted in a material charging opening and fed downwardly to apply the ram pressure to the material in the chamber. In this mixer, the force ram pressure is released only for a required period of time when the phase of the rotors has come within a given range of phase difference within which the rotor drive motor load reaches a peak value. The peak load of the rotor drive motor can be removed to smooth the load, thereby decreasing the safety factor or the current rating of the mixer and largely reducing the cost. Furthermore, it is possible to lower the power receiving cost because of the adoption of a system for power reception based upon a user's demand.

The present invention features the classification of the load of the rotor drive motor into a plurality of classes, so that the force ram pressure will be detected and controlled in accordance with the classes. It is, therefore, possible to optimize the mixing cycle by increasing the chamber pressure slightly higher at the Class II load than at the Class I load.

The invention features the provision of a control device which detects in advance that the phase of both rotors comes within a specific range, to thereby release the force ram pressure, with the time from the release of the force ram pressure until actual pressure drop taken into consideration. It is, therefore, possible to prevent overload by smoothing the load current, to reduce the service factor and rated current of the machine in order to enable the reduction of machine cost and to prevent prolongation of mixing cycle time, thereby improving productivity.

The present invention features the provision of a bypass circuit through a bypass valve in the working fluid supply-discharge line connected to the ram cylinder of the force ram, and therefore the ram pressure release time has been set 10 times faster than conventional ones, so that the ram pressure can be released in the optimum rotor position, thereby enabling the prevention of overload and an improvement in the mixing effect. Furthermore it is possible to realize the reduction of air consumption and accordingly to substantially improve an energy-saving effect.

And the present invention features the provision of a pressure reducing valve in the bypass circuit; in the case of a material which does not require the ram pressure to be fully released, the prolongation of the mixing time can be prevented by optimizing the chamber pressure.

Furthermore, since the present invention features the direct supply of a pressure releasing fluid to the fluid chamber on the pressure releasing side of the force ram cylinder, it is possible to release the force ram pressure rapidly and in a short time, thereby fully preventing the overload.

What is claimed is:

1. A mixer comprising:

a casing and an end frame together defining a mixing chamber and a material charging opening;

a pair of rotors rotatably disposed on rotor shafts within the mixing chamber;

a force ram fittable in said material charging opening for applying a pressure to a material in said mixing chamber; and meshing gears rotatably driving said rotors in opposite directions and with a fixed gear ratio, wherein said gear ratio and phase angles of said rotors are set such that both of said rotors are never simultaneously within a high load region defined as within about 20° of a plane connecting centers of said rotor shafts to prevent excessive loads on said rotors.

2. The mixer of claim 1 wherein said gear ratio corresponds to a ratio of a number of teeth of said meshing teeth, and wherein said ratio of the number of teeth is 1:1.2.

3. The mixer of claim 2 wherein a phase angle of said rotors, defined as an angular difference between said rotors is initially set to be between 25° and 45°.

4. The mixer of claim 1 wherein said gear ratio corresponds to a ratio of a number of teeth of said meshing teeth, and wherein said ratio of the number of teeth is 1:1.

5. A mixer comprising:

a casing and an end frame together defining a mixing chamber and a material charging opening, edges of said material charging opening defining chamber ends;

a force ram fittable in said material charging opening;

means acting on said ram for applying a pressure to a material in said mixing chamber via said ram;

a pair of rotors rotatably disposed on rotor shafts within the mixing chamber; and meshing gears rotatably driving said rotors in opposite directions such that tips of both of said rotors are substantially simultaneously positioned at said chamber ends, wherein said pressure applying means includes means for releasing the pressure on the material when said tips of said rotors reach said chamber ends.

6. A mixer comprising:

a casing and an end frame together defining a mixing chamber and a material charging opening;

a force ram fittable in said material charging opening;

means acting on said ram for applying a pressure to a material in said mixing chamber via said ram;

a pair of rotors rotatably disposed on rotor shafts within the mixing chamber;

a motor rotatably driving said rotors in opposite directions via meshing gears;

means for detecting a rotational phase position of one of said rotors; and means for releasing said pressure applying means for a predetermined period of time when the detected rotational phase of the one rotor is within a phase range in which a load on said motor reaches a peak value.

7. A mixer as claimed in claim 6, wherein the load of said rotor drive motor is classified into a plurality of classes, so that said force ram pressure will be detected and controlled in accordance with said classes thus classified.

8. A mixer as claimed in claim 6, wherein a control device is provided for detecting in advance that a phase difference of said rotors comes within a specific range, to thereby release said force ram pressure, with the time from the release of said force ram pressure until actual pressure drop taken into consideration.

9. A mixer as claimed in claim 5 or 6, wherein a bypass circuit is provided through a bypass valve in a working fluid supply-discharge line connected to said ram cylinder of said force ram.

10. A mixer as claimed in claim 9, wherein a pressure reducing valve is provided in said bypass circuit.

11. A mixer as claimed in claim or 9, wherein a fluid for releasing said pressure is supplied directly into a fluid chamber on the pressure release side of said cylinder of said force ram.

* * * * *